(12) United States Patent
Foster et al.

(10) Patent No.: US 11,135,651 B2
(45) Date of Patent: *Oct. 5, 2021

(54) LASER-STIRRED POWDER BED FUSION

(71) Applicant: EDISON WELDING INSTITUTE, INC., Columbus, OH (US)

(72) Inventors: Bryant K. Foster, Columbus, OH (US); Jacob Marchal, Rapid City, SD (US); Alber Sadek, Dublin, OH (US); Shawn M. Kelly, Huntersville, NC (US)

( * ) Notice: Subject to any disclaimer, the term of this patent is extended or adjusted under 35 U.S.C. 154(b) by 588 days.

This patent is subject to a terminal disclaimer.

(21) Appl. No.: 15/841,579

(22) Filed: Dec. 14, 2017

(65) Prior Publication Data

US 2018/0290209 A1    Oct. 11, 2018

Related U.S. Application Data

(63) Continuation of application No. 15/603,620, filed on May 24, 2017.

(60) Provisional application No. 62/340,719, filed on May 24, 2016.

(51) Int. Cl.
| | |
|---|---|
| *B22F 3/105* | (2006.01) |
| *B33Y 10/00* | (2015.01) |
| *B22F 10/20* | (2021.01) |
| *B33Y 50/02* | (2015.01) |
| *G02B 27/09* | (2006.01) |

(Continued)

(52) U.S. Cl.
CPC ............. *B22F 10/20* (2021.01); *B33Y 10/00* (2014.12); *B33Y 50/02* (2014.12); *G02B 27/09* (2013.01); *H01S 3/00* (2013.01); *B22F 2999/00* (2013.01); *B33Y 80/00* (2014.12); *Y02P 10/25* (2015.11)

(58) Field of Classification Search
None
See application file for complete search history.

(56) References Cited

U.S. PATENT DOCUMENTS

2002/0015654 A1* 2/2002 Das .................. B22F 3/1055
                                                        419/8
2016/0298218 A1* 10/2016 Kilmer ................. B33Y 10/00

FOREIGN PATENT DOCUMENTS

DE     102007059865 A1 *  6/2009  ............ B22F 3/1055

OTHER PUBLICATIONS

"Chapter 5: Powder Bed Fusion Processes."Additive Manufacturing Technologies, by Ian Gibson, Springer, 2010, pp. 103-142. (Year: 2010) (Year: 2010).*

* cited by examiner

*Primary Examiner* — Anthony M Liang

(57) ABSTRACT

An additive manufacturing process that includes providing a first layer of powdered material having a predetermined thickness; using a laser beam that follows a predetermined path to fuse a portion of the material in the first layer, wherein the predetermined path of the laser beam is a repeating circular or elliptical path which incrementally proceeds in a linear direction; providing a second layer of powdered material having a predetermined thickness; using a laser beam that follows a predetermined path to fuse a portion of the material in the second layer, wherein the predetermined path of the laser beam is a repeating circular or elliptical path which incrementally proceeds in a linear direction; repeating the previous steps until a complete part or component is created; and removing any unfused powdered material from the completed part or component.

12 Claims, 11 Drawing Sheets

(51) Int. Cl.
*H01S 3/00* (2006.01)
*B33Y 80/00* (2015.01)

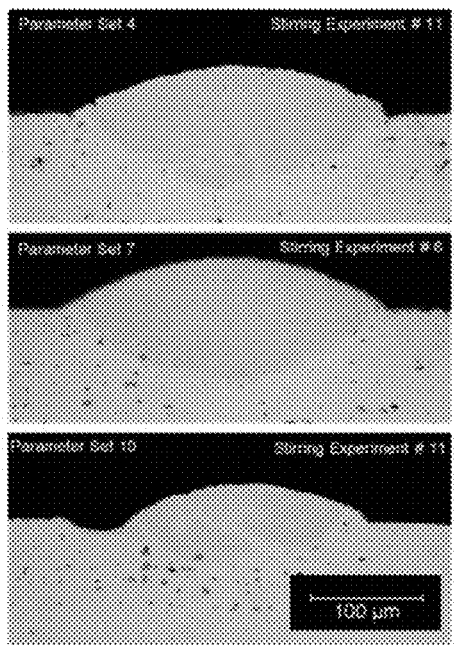
FIG. 4A
FIG. 4B
FIG. 4C
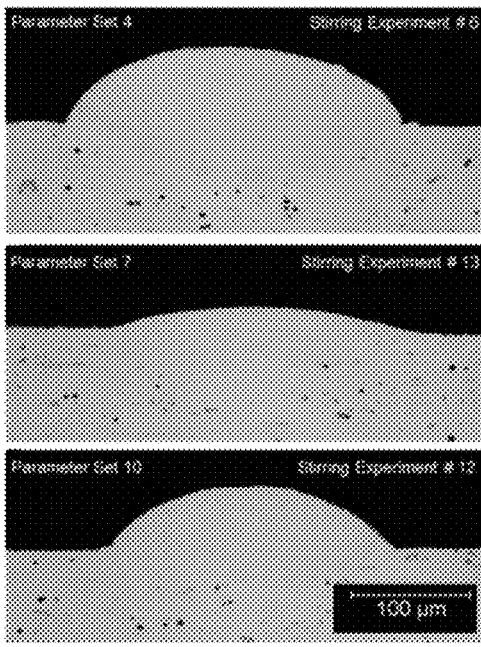
FIG. 5A
FIG. 5B
FIG. 5C
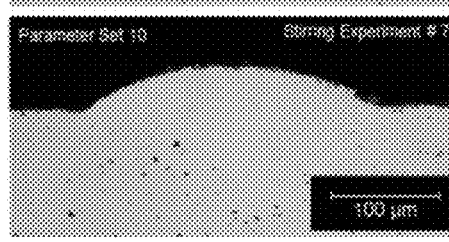
FIG. 6A
FIG. 6B
FIG. 6C
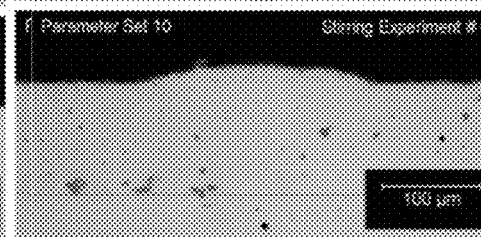
FIG. 7A
FIG. 7B
FIG. 7C

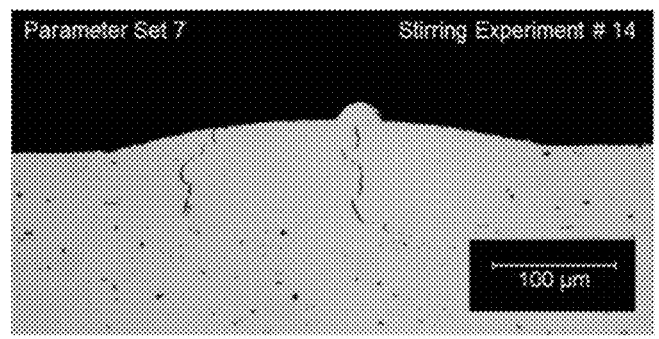
FIG. 8
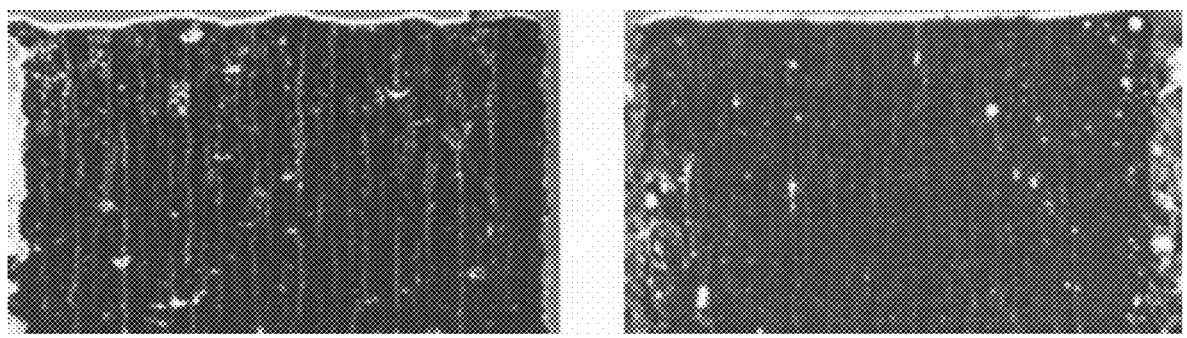
FIG. 9A
(linear hatching)
FIG. 9B
(stirred hatching)
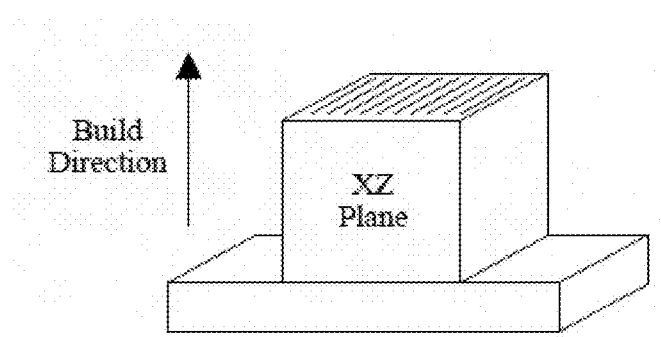
FIG. 9C (stirred hatching: Al 6061)

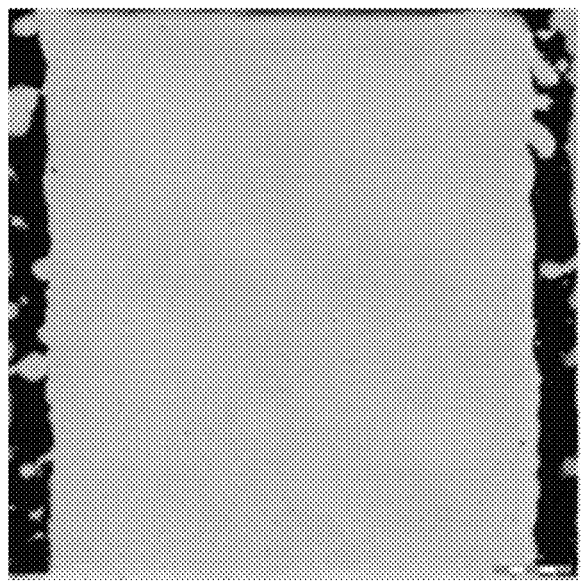 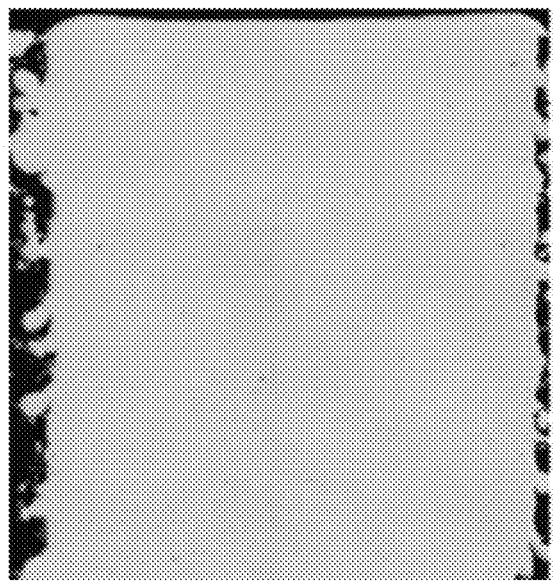
FIG. 11A
(stirred hatching A205)
FIG. 11B
(stirred hatching: aluminum scandium)

(linear hatching)

(stirred hatching)

(stirred hatching)

(stirred hatching)

(linear hatching)

(stirred hatching)

(stirred hatching)

(linear hatching)

(stirred hatching)

(stirred hatching)

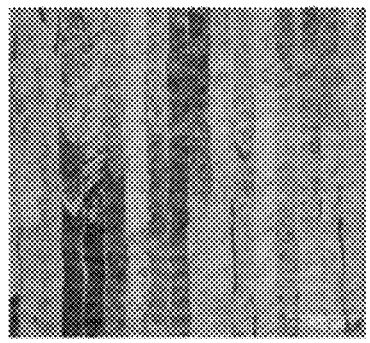
FIG. 15A
(linear hatching)
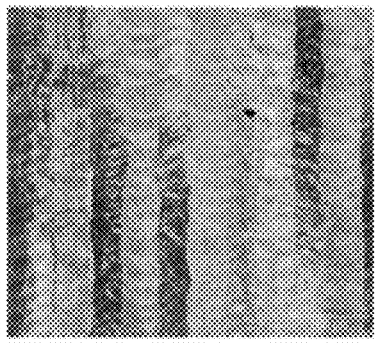
FIG. 15B
(stirred hatching)
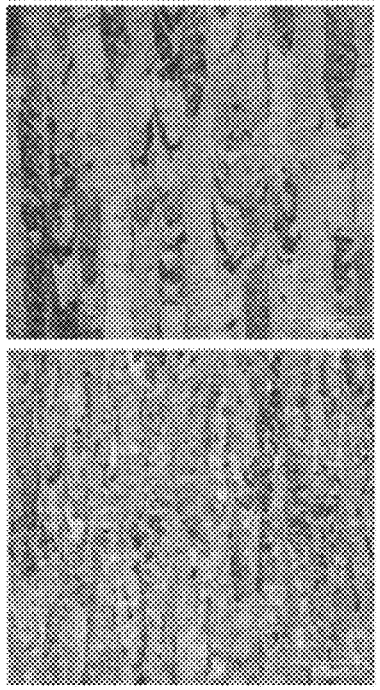
FIG. 15C
(stirred hatching)
FIG. 15D
(stirred hatching)

LASER-STIRRED POWDER BED FUSION

CROSS-REFERENCE TO RELATED APPLICATIONS

This patent application is a continuation of U.S. patent application Ser. No. 15/603,620 filed on May 24, 2017 and entitled "Laser-Stirred Powder Bed Fusion" which claimed the benefit of U.S. Provisional Patent Application Ser. No. 62/340,719 filed on May 24, 2016 and entitled "Laser-Stirred Power Bed Fusion", the disclosures of which are hereby incorporated by reference herein in their entirety and made part of the present U.S. utility patent application for all purposes.

BACKGROUND OF THE INVENTION

The described invention relates in general to additive manufacturing processes, and more specifically to a powder bed fusion process that includes laser stirring as an aspect thereof.

In general, the powder bed fusion (PBF) process utilizes either a laser or an electron beam to melt and fuse material powder for the purpose of creating a part or component. PBF processes typically involve spreading material in the form of powder over previously deposited layers of material. There are different mechanisms for accomplishing this including, for example, the use of a roller or a blade. A hopper or a reservoir positioned below or next to a powder bed is used to provide fresh material powder. Electron beam powder bed fusion (EB-PBF), also known as electron beam melting (EBM), requires a vacuum, but can be used with metals and alloys for the creation of functional parts. Laser powder bed fusion (L-PBF), also known as selective laser melting (SLM), or direct metal laser melting (DMLM), is equivalent to selective laser sintering (SLS), but involves the use of metals rather than plastics. Also, in L-PBF, the material fully melts, whereas in SLS, the material partially sinters. Selective heat sintering (SHS) differs from other processes through the use of a heated thermal print head for fusing material powder. As before, layers are added with a roller in between fusion of layers and a platform lowers the part accordingly.

Laser powder bed fusion (L-PBF) is an additive manufacturing process in which a three-dimensional component or part is built using a layer-by-layer approach. With reference to FIG. 1, L-PBF system and apparatus 10 includes housing 12, which includes region 14 for containing new powder stock that is moved by powder roller 16 into powder bed 18, which sits on build platform 20, upon which component or part 22 is created by laser 24. L-PBF typically involves the following general steps: (i) a layer of powdered material (e.g., metal), typically about 0.1 mm thick, is spread over build platform 20; (ii) laser 24 fuses the first layer or first cross section of part 22; (iii) a new layer of powder is spread across the previous layer using roller 16 or a similar device; (iv) further layers or cross sections are fused and added; and (v) the process is repeated until the entire part 22 is created. Loose, unfused powdered material remains in position, but is removed during post processing.

Conventional laser powder bed fusion (L-PBF) utilizes a back and forth linear hatch pattern to melt a layer of metal powder. Conceptually, the individual hatches are straight welds that are laid side-by-side and then stacked in subsequent layers to create a three-dimensional fully dense build. As such, materials which cannot be welded autogenously cannot be utilized in the L-PBF process without major alterations. For example, high-strength aluminum alloys are plagued by cracking and porosity, which lead to unacceptable bulk materials and builds. This is the case in multiple additive technologies including electron beam processes. Thus, there is an ongoing need for an L-PBF process that can be used with materials that are normally not compatible with L-PBF systems and methodologies.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a first additive manufacturing process is provided. This additive manufacturing process includes providing a first layer of powdered material, wherein the first layer of powdered material has a predetermined thickness; using a laser that follows a predetermined path to fuse a portion of the material in the first layer, wherein the predetermined path of the laser creates a series of stirred hatches in the fused material; providing a second layer of powdered material, wherein the second layer of powdered material has a predetermined thickness; using a laser that follows a predetermined path to fuse a portion of the material in the second layer, wherein the predetermined path of the laser creates a series of stirred hatches in the fused material; repeating the previous steps until a complete part or component is built; and removing any unfused powdered material from the completed build.

In accordance with another aspect of the present invention, a second additive manufacturing process is provided. This additive manufacturing process includes providing a first layer of powdered material, wherein the first layer of powdered material has a predetermined thickness; using a laser beam that follows a predetermined path to fuse a portion of the material in the first layer, wherein the predetermined path of the laser beam is a repeating oscillating path which incrementally proceeds in a linear direction; providing a second layer of powdered material, wherein the second layer of powdered material has a predetermined thickness; using a laser beam that follows a predetermined path to fuse a portion of the material in the second layer, wherein the predetermined path of the laser beam is a repeating oscillating path which incrementally proceeds in a linear direction; repeating the previous steps until a complete part or component is built; and removing any unfused powdered material from the completed build.

In yet another aspect of this invention, a third additive manufacturing process is provided. This additive manufacturing process includes providing a first layer of powdered material, wherein the first layer of powdered material has a predetermined thickness; using a laser beam that follows a predetermined path to fuse a portion of the material in the first layer, wherein the predetermined path of the laser beam is a repeating circular or elliptical path which incrementally proceeds in a linear direction; providing a second layer of powdered material, wherein the second layer of powdered material has a predetermined thickness; using a laser beam that follows a predetermined path to fuse a portion of the material in the second layer, wherein the predetermined path of the laser beam is a repeating circular or elliptical path which incrementally proceeds in a linear direction; repeating the previous steps until a complete part or component is built; and removing any unfused powdered material from the completed build.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings/figures and associated descriptions are to be regarded as illustrative and not restrictive in nature.

BRIEF DESCRIPTION OF THE DRAWINGS

The accompanying drawings, which are incorporated into and form a part of the specification, schematically or photographically illustrate one or more exemplary embodiments of the invention and, together with the general description given above and detailed description given below, serve to explain the principles of the invention, and wherein:

FIGS. 4A-4C provide multiple cross-sectional views of stirred weld experiments for AlSi10Mg;

FIGS. 5A-5C provide multiple cross-sectional views of stirred weld experiments for Al6061;

FIGS. 6A-6C provide multiple cross-sectional views of stirred weld experiments for Al7075;

FIGS. 7A-7C provide multiple cross-sectional views of stirred weld experiments for Al2024;

FIG. 8 is a cross-sectional view of cracking that is typical in an Al7075 weld;

FIG. 9A is an unetched cross-sectional view a of a multilayer Al7075 build with linear hatching;

FIG. 9B is an unetched cross-sectional view a of a multilayer Al7075 build with stirred hatching;

FIG. 9C is a graphic depicting the build direction of FIGS. 7A and 7B in the XZ plane;

FIG. 11A is an unetched XZ plane cross-sectional view of a fully dense, multilayer A205 build with stirred hatching, wherein the build directions of FIG. 11A is the same as that shown in FIG. 9C;

FIG. 11B is an unetched XZ plane cross-sectional view of a fully dense, multilayer aluminum scandium build with stirred hatching, wherein the build direction of FIG. 11B is the same as that shown in FIG. 7C;

FIG. 15A is an XZ plane cross-sectional view of a multilayer Ti-6Al-4V build deposited using linear hatching, wherein the build directions of FIG. 15A is the same as that shown in FIG. 7C; and FIGS. 15B-15D are XZ plane cross-sectional views of a multilayer Ti-6Al-4V builds deposited with varied parameter combinations using stirred hatching to alter build microstructure, wherein the build directions of 15B-15D are the same as that shown in FIG. 9C.

DETAILED DESCRIPTION OF THE INVENTION

Exemplary embodiments of the present invention are now described with reference to the Figures. Although the following detailed description contains many specifics for purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The present invention includes the application of laser stirring to the L-PBF additive manufacturing process (LS-PBF) and addresses inherent difficulties in the process by using a variety of materials in traditional L-PBF including high-strength aluminum alloys. As previously stated, such alloys often suffer from cracking and porosity, which leads to unacceptable bulk materials and builds. The additive manufacturing industry has researched chemistry alterations to more common alloys for specific use in L-PBF and has searched for existing materials with equivalent or comparable material properties. This invention differs from these approaches in that it alters the laser weld path used in the entire L-PBF process and allows for the use of materials that have been heavily certified and relied on in other technologies in L-PBF processes.

Figure 1:
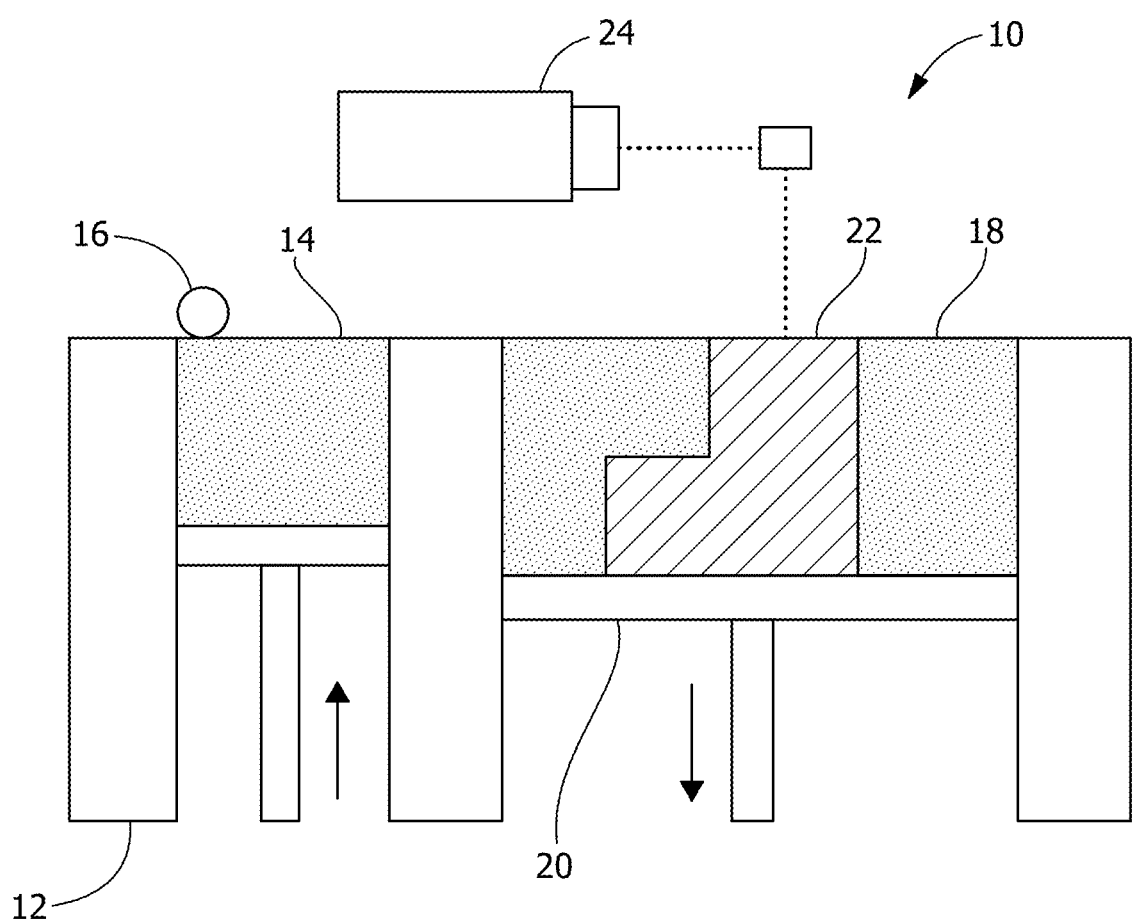
FIG. 1 is a generalized drawing of an exemplary laser powder bed fusion process and a laser bed fusion system and apparatus.
Figure 2A:
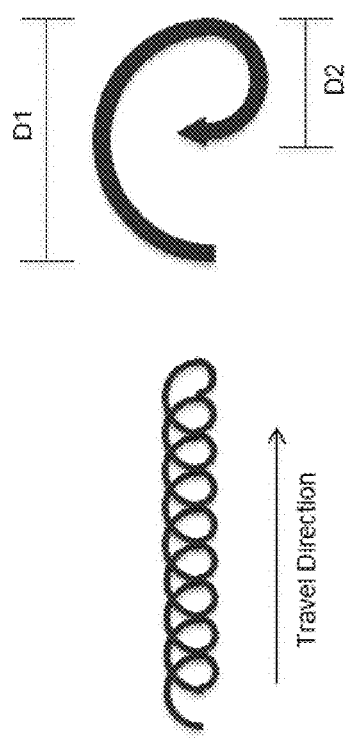
FIG. 2A provides laser stirring path schematics for circular oscillation, in accordance with an exemplary embodiment of the present invention.
Figure 2B:
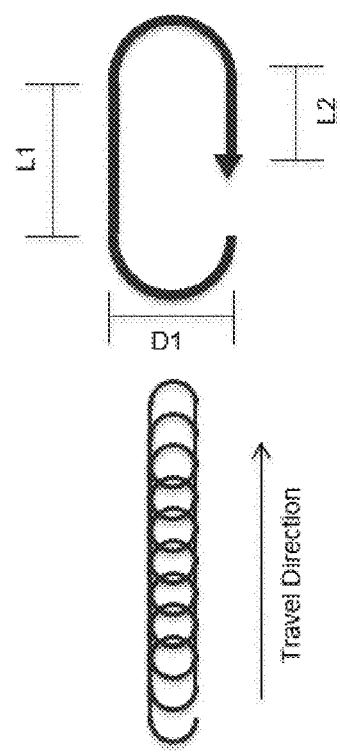
FIG. 2B provides laser stirring path schematics for elliptical oscillation, in accordance with an exemplary embodiment of the present invention.

Conventional laser powder bed fusion (L-PBF) utilizes a back and forth linear hatch pattern to melt a layer of metal powder. Conceptually, the individual hatches are straight welds which are laid side by side and then stacked in subsequent layers to create a three-dimensional fully dense build. As such, materials which cannot be welded autogenously cannot be utilized in the L-PBF process without major alterations. The present invention includes the application of laser beam stirring to each of the hatches in each layer. With reference to FIGS. 2A-2B and Tables 1 and 2, below, an oscillatory path was programmed into a test bed for circular and elliptical stirring parameters. FIGS. 2A-2B provide laser stirring path schematics for circular and elliptical oscillation. Table 1 provides circular stirring dimensional parameters and Table 2 provides elliptical stirring dimensional parameters.

TABLE 1

Circular Stirring Dimensional Parameters

| | Experiment Number within the Parameter Set | | | | |
|---|---|---|---|---|---|
| | 6 | 7 | 8 | 9 | 10 |
| Stirring Type | Circular | Circular | Circular | Circular | Circular |
| D1 (μm) | 90 | 180 | 180 | 270 | 360 |
| D2 (μm) | 45 | 135 | 90 | 180 | 270 |

TABLE 2

Elliptical Stirring Dimensional Parameters

| | Experiment Number within the Parameter Set | | | | |
|---|---|---|---|---|---|
| | 11 | 12 | 13 | 14 | 15 |
| Stirring Type | Elliptical | Elliptical | Elliptical | Elliptical | Elliptical |
| D1 (μm) | 90 | 90 | 180 | 180 | 180 |
| L1 (μm) | 45 | 90 | 90 | 180 | 180 |
| L2 (μm) | 30 | 45 | 45 | 135 | 90 |

Laser stirring paths were run using a range of laser powers and travel speeds to determine optimal parameters for multiple aluminum alloys. Results indicated that the application of laser stirring results in fully dense, crack-free consolidation of AlSi10Mg, Al6061, Al7075, and Al2024 metal powder on a metal substrate. The balancing of heat input, oscillation travel speed, linear travel speed, and thermal response time of the material being processed ensures that weld cracking and porosity are eliminated or otherwise rendered insignificant. The welded area begins initial solidification, but does not fully solidify before the oscillation of the laser path returns to break up the dendritic microstructure which is in the process of forming. If tuned correctly, this invention refines the final weld microstructure while eliminating problems related to solidification cracking, which is due to a combination of known factors.

Figure 3:
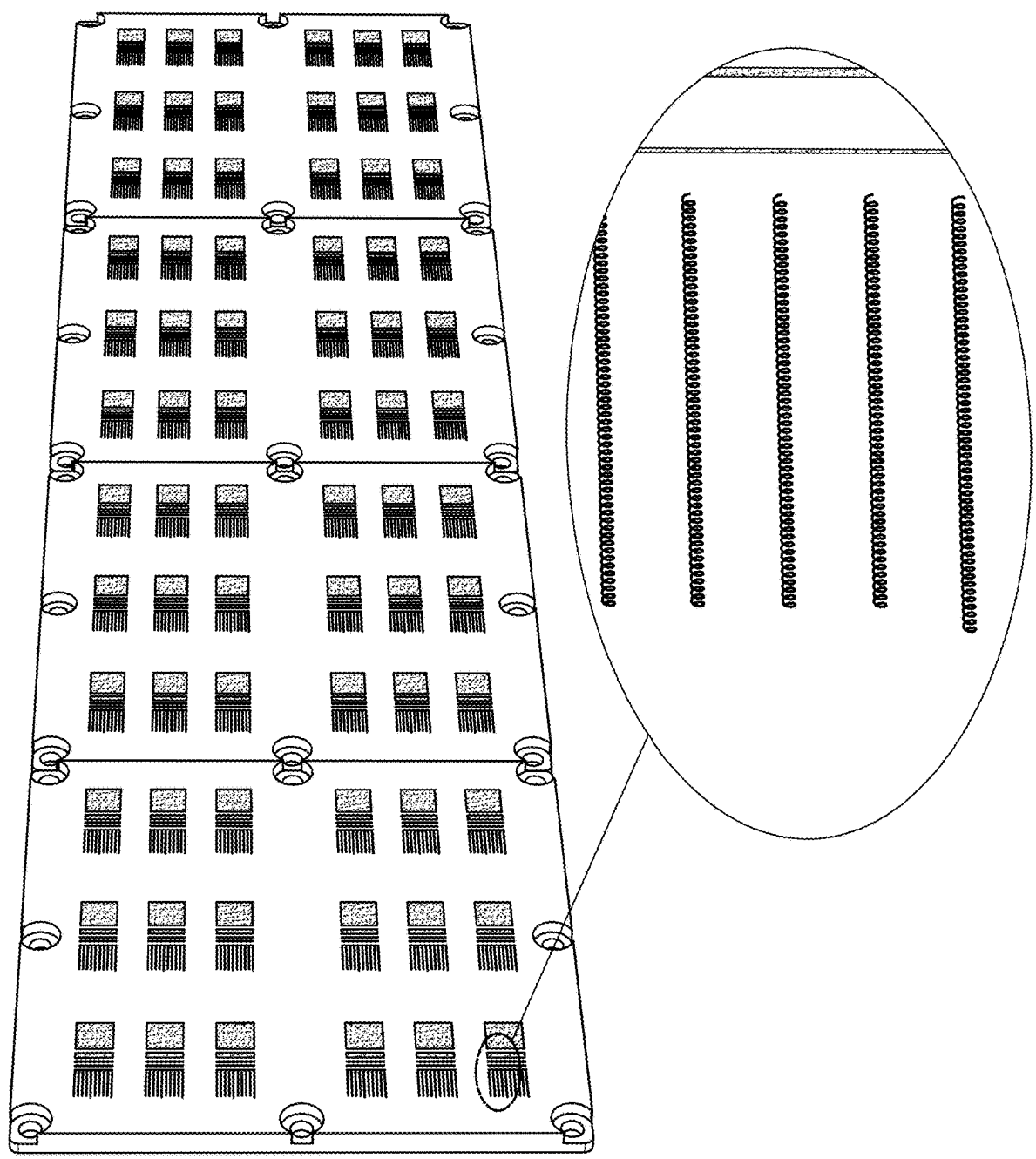
FIG. 3 depicts four aluminum substrates with 1080 individual stirring experiments completed and powder layers removed.

The present invention was tested using four different aluminum alloys. Single powder layers (about 40 micron thick) of AlSi10Mg, Al6061, Al7075, and Al2024 were placed on corresponding aluminum substrates. Each substrate and powder layer then had 270 stirring experiments and path variations performed for a total of 1080 individual experiments, shown in FIG. 3. Of the 1080, 120 were selected for sectioning and inspection with heat inputs ranging from 0.1169 to 0.3795 W/(mm/s). FIGS. 4A-4C, 5A-5C, 6A-6C, and 7A-7C show some of the positive results for oscillated laser welds with each alloy. A typical cross-section of a prior art weld would show a high degree of cracking or porosity using these alloys, as shown in FIG. 8 for Al7075. The results presented herein (FIGS. 4A-4C, 5A-5C, 6A-6C, and 7A-7C) show fully dense, crack free weld cross sections for three very different laser speeds and powers in each alloy. This result is illustrative with regard to the efficacy of stirring in reducing cracking and porosity over a wide range of parameters using select stirring paths and frequencies. The building of fully dense prisms and further optimization of stirring parameters are aspects of this invention.

Figure 10:
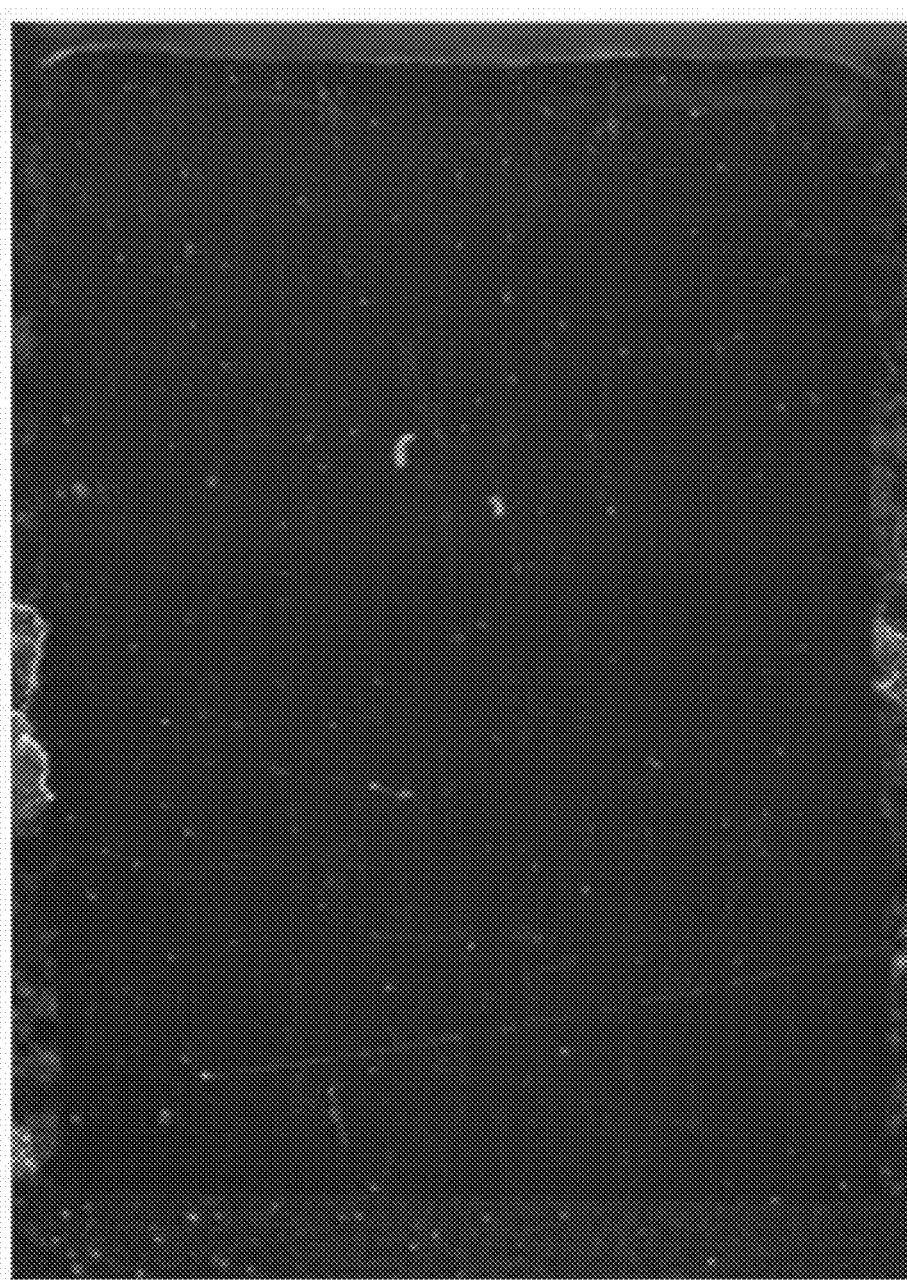
FIG. 10 is an unetched cross-sectional view of a multilayer Al6061 build with stirred hatching, wherein the build direction is the same as that shown in FIG. 9C.
Figure 12A:
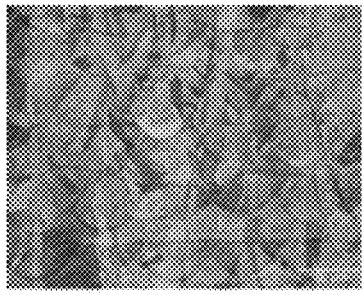
FIG. 12A is an XZ plane cross-sectional view of a multilayer Inconel 718 build deposited using linear hatching, wherein the build direction of FIG. 12A is the same as that shown in FIG. 9C.
Figure 12B:
FIGS. 12B-12D are XZ plane cross-sectional views of multilayer Inconel 718 builds deposited with varied parameter combinations using stirred hatching to alter build microstructure, wherein the build directions of FIG. 12B-12D are the same as that shown in FIG. 9C.
Figure 12C:
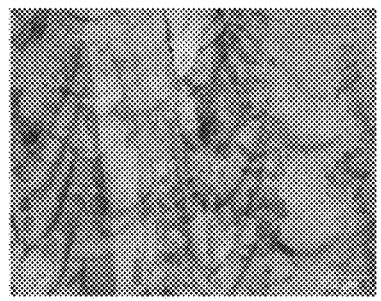
Figure 12D:
Figure 13A:
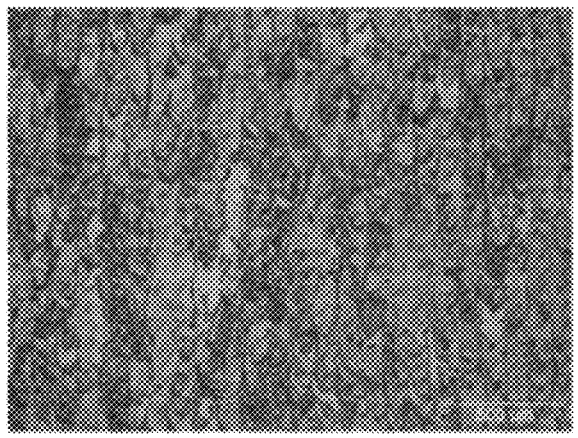
FIG. 13A is an XZ plane cross-sectional view of a multilayer 316L stainless steel build deposited using linear hatching, wherein the build direction of FIG. 13A is the same as that shown in FIG. 9C.
Figure 13B:
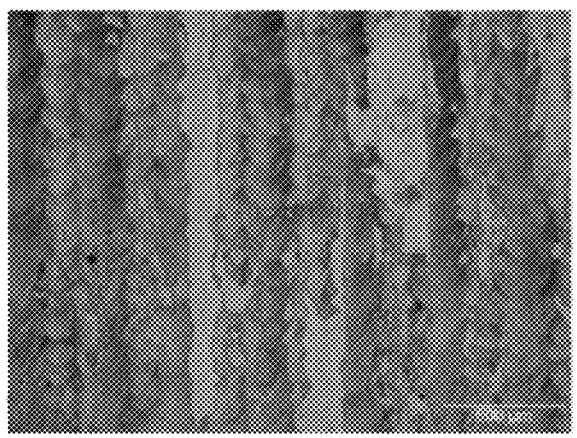
FIGS. 13B-13C are XZ plane cross-sectional views of a multilayer 316L stainless steel builds deposited with varied parameter combinations using stirred hatching to coarsen build microstructure, wherein the build directions of FIGS. 13B-13C are the same as that shown in FIG. 9C.
Figure 13C:
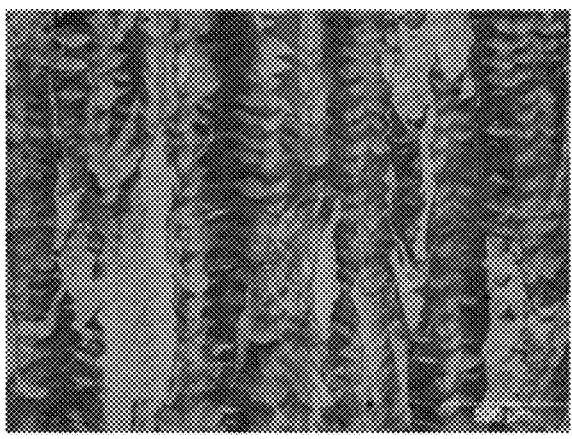
Figure 14A:
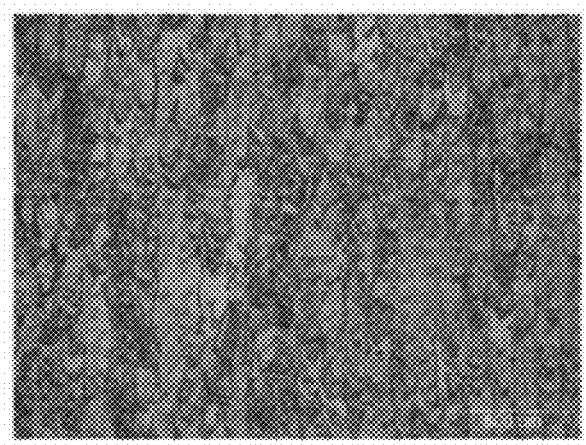
FIG. 14A is an XZ plane cross-sectional view of a multilayer 316L stainless steel build deposited using linear hatching, wherein the build direction of FIG. 14A is the same as that shown in FIG. 9C.
Figure 14B:
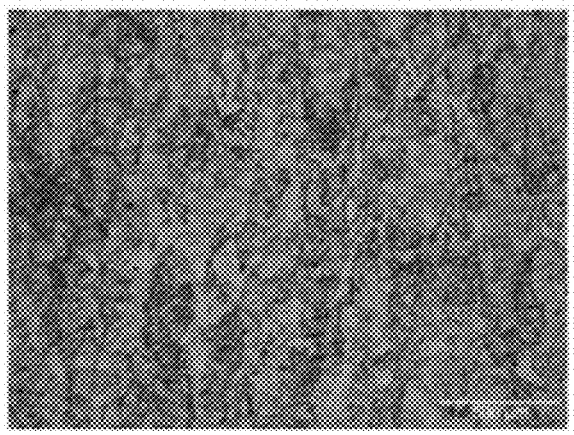
FIGS. 14B-14C are XZ plane cross-sectional views of a multilayer 316L stainless steel builds deposited with varied parameter combinations using stirred hatching to alter build microstructure, wherein the build directions of 14B-14C are the same as that shown in FIG. 9C.
Figure 14C:
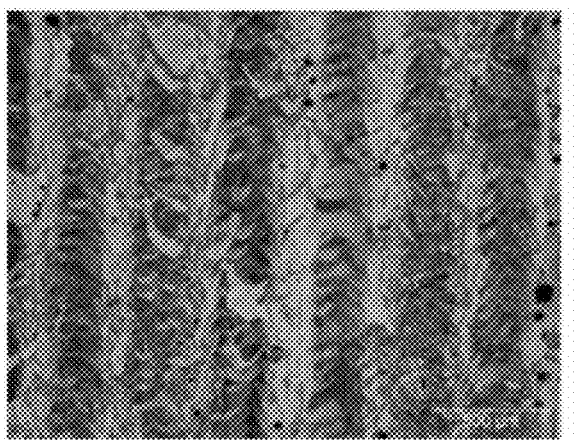

The present invention was further demonstrated by building up multiple 40 micron thick layers of stirred hatches which were side by side, resulting in a three-dimensional deposit. FIGS. 9A and 9B show a direct comparison between a multilayer deposit built with linear hatches and a multilayer deposit built with stirred hatches. One of ordinary skill in the art will appreciate the reduction in cracking severity, resulting in a higher overall quality build. FIG. 10 and FIGS. 11A-11B illustrate the successful application of stirred hatches in multilayer deposits for Al 6061, A205, and Aluminum Scandium alloys. In each case, low amounts of cracking and porosity are observed Three A205 tensile specimens each were built using stirred and linear hatches to evaluate differences in mechanical properties based on the application of this invention. Stirred specimens showed an average UTS and YS of 321 MPa and 192 MPa respectively in the as-built condition. Linear hatched specimens displayed an average UTS and YS of 295 MPa and 172 MPa respectively in the as-built condition. For this alloy, stirred hatching resulted in an increase in UTS and YS of ~9% and ~11% respectively over linear hatching. This result further illustrates the beneficial effect of the present invention on as-built microstructure.

The present invention was also demonstrated on non-aluminum alloys including Inconel 718, 316L Stainless Steel, and Ti-6Al-4V. Builds were completed using laser stirred hatching with up to 30 different combinations of laser travel speed, laser power, hatch spacing, and stirring paths. FIGS. 12A-12D show the typical as-built microstructure for linear hatching (FIG. 12A) and three variations in microstructure (FIGS. 12B-D) possible with stirred hatching for Inconel 718. Grain refinement and the formation of necklace microstructure, containing both large and small grains, are apparent in the stirred hatching builds. FIGS. 13A-13C and 14A-14C show the typical as-built microstructure for linear hatching (FIGS. 13A and 14A) and four variations in microstructure possible with stirred hatching (FIGS. 13B-13C and 14B-14C) for 316L stainless steel. The stirred hatching builds display larger grains, columnar grains, less elongated grains, and/or combinations of large and small grains depending on the stirring parameters employed. FIGS. 15A-15D show the typical as-built microstructure for linear hatching (FIG. 15A) and three variations in microstructure (FIGS. 15B-15D) possible with stirred hatching for Ti-6Al-4V. As would be apparent to one of ordinary skill in the art, the columnar microstructure visible in the linear hatched build can be coarsened or refined to various levels through the use of stirred hatches. These positive results for three common L-PBF alloys show that laser stirred hatching can be used to effectively tailor microstructure in three-dimensional builds. Grain refinement, reduction of anisotropy, and texture alteration are accomplished through stirring by balancing heat input, oscillation travel speed, linear travel speed, and thermal response time of the material being processed to ensure that grains are broken up after partial solidification. The same factors can be tuned or otherwise manipulated such that the stirred path mimics a larger spot size laser and the material experiences slower cooling rates, thereby resulting in grain coarsening.

Important advantages and aspects of this invention include the following: (i) application of a stirred laser path to L-PBF processes, which traditionally use straight laser paths (linear hatches); (ii) beam path oscillations (circular and elliptical) at frequencies up to and over 7500 Hz with oscillation widths down to 45 μm; and (iii) a balancing between heat input, oscillation travel speed, linear travel speed, and thermal response time of the material being processed. This process provides for the use of a range of materials which are currently not plausible for use in L-PBF processes, such as high strength aluminum alloys of the 6XXX and 7XXX series. The process has been shown to improve as-built material properties of builds by increasing grain refinement in aluminum alloys. Additionally, LS-PBF has shown great success in modifying as-built microstructure compared to linear hatching, creating opportunities for location based microstructural tailoring in builds without any required post processing steps as well as general increases in additively manufactured material properties.

While the present invention has been illustrated by the description of exemplary embodiments thereof, and while the embodiments have been described in certain detail, it is not the intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:
1. An additive manufacturing process, comprising:
   (a) providing a first layer of powdered material, wherein the first layer of powdered material has a predetermined thickness;
   (b) altering build microstructure from that of linear hatching by using a laser that follows a predetermined linear path across the first layer of powdered material to fuse a portion of the powdered material in the first layer, wherein the predetermined linear path of the laser creates a series of immediately adjacent curvilinear hatches or partially overlapping curvilinear hatches in the fused powdered material, wherein the hatches are either circular or elliptical;
   (c) providing a second layer of powdered material, wherein the second layer of powdered material has a predetermined thickness;
   (d) altering build microstructure from that of linear hatching by using a laser that follows a predetermined linear path across the second layer of powdered material to fuse a portion of the material in the second layer, wherein the predetermined linear path of the laser creates a series of immediately adjacent curvilinear hatches or partially overlapping curvilinear hatches in the fused powdered material, wherein the hatches are either circular or elliptical;
   (e) repeating steps (a)-(d) until a complete part or component is built; and
   (f) removing any unfused powdered material from the complete part or component.

2. The process of claim 1, wherein the powdered material includes at least one aluminum alloy.

3. The process of claim 1, wherein the powdered material includes Inconel 718, 316L stainless steel, Ti-6A1-4V, or a combination thereof.

4. An additive manufacturing process, comprising:
   (a) providing a first layer of powdered material, wherein the first layer of powdered material has a predetermined thickness;
   (b) creating a series of immediately adjacent curvilinear hatches or partially overlapping curvilinear hatches in the first layer of powdered material using a laser beam that follows a predetermined path that proceeds incrementally in a linear direction across the first layer of powdered material to fuse a portion of the powdered material in the first layer, and wherein the predetermined path of the laser beam is a repeating oscillating path that is either circular or elliptical;
   (c) providing a second layer of powdered material, wherein the second layer of powdered material has a predetermined thickness;
   (d) creating a series of immediately adjacent curvilinear hatches or partially overlapping curvilinear hatches in the second layer of powdered material using a laser beam that follows a predetermined path that proceeds incrementally in a linear direction across the second layer of powdered material to fuse a portion of the powdered material in the second layer, and wherein the predetermined path of the laser beam is a repeating oscillating path that is either circular or elliptical;
   (e) creating a predetermined balance between heat input, oscillation travel speed, linear travel speed, and thermal response time of the powdered material being processed;
   (f) repeating steps (a)-(e) until a complete part or component is built; and
   (g) removing any unfused powdered material from the complete part or component.

5. The process of claim 4, wherein the powdered material includes at least one aluminum alloy having predetermined grain characteristics.

6. The process of claim 5, wherein the process increases grain refinement in the at least one aluminum alloy.

7. The process of claim 4, wherein the powdered material includes Inconel 718, 316L stainless steel, Ti-6A1-4V, or a combination thereof.

8. The process of claim 4, wherein the frequency of the oscillating beam path is at least 7500 Hz.

9. An additive manufacturing process, comprising:
   (a) providing a first layer of powdered material, wherein the first layer of powdered material has a predetermined thickness;
   (b) creating a series of immediately adjacent curvilinear hatches or partially overlapping curvilinear hatches in the first layer of powdered material using a laser beam that follows a predetermined path that proceeds incrementally in a linear direction across the first layer of powdered material to fuse a portion of the powdered material in the first layer, wherein the predetermined path of the laser beam is a repeating oscillating path that is either circular or elliptical, and wherein the frequency of the circular or elliptical beam path is at least 7500 Hz;
   (c) providing a second layer of powdered material, wherein the second layer of powdered material has a predetermined thickness;
   (d) creating a series of immediately adjacent curvilinear hatches or partially overlapping curvilinear hatches in the second layer of powdered material using a laser beam that follows a predetermined path that proceeds incrementally in a linear direction across the second layer of powdered material to fuse a portion of the powdered material in the second layer, wherein the predetermined path of the laser beam is a repeating oscillating path that is either circular or elliptical, and wherein the frequency of the circular or elliptical beam path is at least 7500 Hz;
   (e) creating a predetermined balance between heat input, oscillation travel speed, linear travel speed, and thermal response time of the powdered material being processed;

(f) repeating steps (a)-(e) until a complete part or component is built; and (g) removing any unfused powdered material from the complete part or component.

10. The process of claim 9, wherein the powdered material includes at least one aluminum alloy having predetermined grain characteristics.

11. The process of claim 10, wherein the process increases grain refinement in the at least one aluminum alloy.

12. The process of claim 10, wherein the powdered material includes Inconel 718, 316L stainless steel, Ti-6A1-4V, or a combination thereof.

* * * * *